(12) United States Patent
Lee et al.

(10) Patent No.: US 12,115,765 B2
(45) Date of Patent: Oct. 15, 2024

(54) DISPLAY MODULE

(71) Applicant: LG Display Co., Ltd., Seoul (KR)

(72) Inventors: Junjae Lee, Paju-si (KR); Jicheol Son, Hanam-si (KR); Insik Shin, Seoul (KR); Myeongah Shin, Seoul (KR); Ganghoon Im, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 91 days.

(21) Appl. No.: 17/470,663

(22) Filed: Sep. 9, 2021

(65) Prior Publication Data
US 2022/0164006 A1  May 26, 2022

(30) Foreign Application Priority Data

Nov. 23, 2020  (KR) .................. 10-2020-0157399

(51) Int. Cl.
   *B32B 3/26* (2006.01)
   *B32B 5/18* (2006.01)
   *B32B 7/12* (2006.01)
   *B32B 27/06* (2006.01)
   *G06F 1/16* (2006.01)
   *G06F 1/20* (2006.01)
   *G06V 40/13* (2022.01)

(52) U.S. Cl.
   CPC .............. *B32B 3/266* (2013.01); *B32B 5/18* (2013.01); *B32B 7/12* (2013.01); *B32B 27/065* (2013.01); *G06F 1/1686* (2013.01); *G06F 1/203* (2013.01); *B32B 2307/402* (2013.01); *B32B 2457/20* (2013.01); *G06V 40/13* (2022.01)

(58) Field of Classification Search
   CPC .. B32B 7/12; B32B 3/266; B32B 5/18; B32B 27/065; B32B 2307/402; B32B 2457/20; G06V 40/13
   See application file for complete search history.

(56) References Cited

U.S. PATENT DOCUMENTS

| 10,691,921 B2 | 6/2020 | Seo et al. |
| 10,839,191 B2 | 11/2020 | Kim et al. |
(Continued)

FOREIGN PATENT DOCUMENTS

| JP | 5529427 B2 * | 6/2014 |
| KR | 10-0726548 B1 | 6/2007 |
(Continued)

*Primary Examiner* — Sophie Hon
(74) *Attorney, Agent, or Firm* — Seed IP Law Group LLP

(57) ABSTRACT

A display module includes a cushion plate having a transmittance of 20% to 40% of light at a spectrum wavelength of 380 nm to 780 nm in an area thereof other than an area in which a through-hole is formed, such that a difference between transmittances in the area in which the through-hole is not formed and the area in which the through-hole is formed may be reduced as much as possible. Reducing the difference between the transmittances in the area in which the through-hole is not formed and the area in which the through-hole is formed as much as possible may allow reflected-light visibility in the area in which the through-hole is not formed and reflected-light visibility in the area in which the through-hole is formed to be realized in close to each other as much as possible, thereby minimizing low gray-level mura near the through-hole area.

19 Claims, 12 Drawing Sheets

(56) References Cited

U.S. PATENT DOCUMENTS

| | | | | |
|---|---|---|---|---|
| 2009/0035563 | A1* | 2/2009 | Husemann | C09J 7/22 |
| | | | | 428/354 |
| 2013/0316112 | A1* | 11/2013 | Leonhard | B32B 7/06 |
| | | | | 428/323 |
| 2019/0073505 | A1* | 3/2019 | Kwon | H05K 5/0017 |
| 2019/0197286 | A1* | 6/2019 | Kim | H10K 59/12 |
| 2020/0192148 | A1* | 6/2020 | Kim | G02F 1/133512 |

FOREIGN PATENT DOCUMENTS

| | | |
|---|---|---|
| KR | 10-2019-0030907 A | 3/2019 |
| KR | 10-2019-0076081 A | 7/2019 |
| KR | 10-2019-0079159 A | 7/2019 |
| KR | 10-2020-0048286 A | 5/2020 |

\* cited by examiner

DISPLAY MODULE

CROSS-REFERENCE TO RELATED APPLICATION

This application claims priority to Korean Patent Application No. 10-2020-0157399 filed on Nov. 23, 2020, in the Korean Intellectual Property Office, the entire disclosure of which is incorporated herein by reference.

BACKGROUND

Technical Field

The present disclosure relates to a display module including a through-hole inside a display area. More specifically, the present disclosure provides a display module that may minimize occurrence of low gray-level mura near the through-hole.

Description of the Related Art

Display devices are being implemented in a wide variety of forms such as televisions, monitors, smart phones, tablet PCs, notebook computers, and wearable devices.

The display device may generally include a display area displaying a screen and a non-display area formed along an outer periphery of the display area.

The non-display area is also referred to as a bezel area. When the bezel area is thick, a user's gaze is distracted, whereas when the bezel area is thin, the user's gaze is fixed on the screen of the display area and thus user's immersion increases.

In one example, in a recent display device, various components such as a camera module, a speaker, and a facial recognition sensor module may be disposed on a front surface of a display device having the display area.

In this case, an area in which the various components as described above are disposed may be the non-display area, and thus an increase in the non-display area may result in a decrease in the user's immersion.

BRIEF SUMMARY

In order to minimize the increase in the non-display area due to the various components disposed on the front surface of the display device, holes may be formed in the display area such that the components may be respectively inserted into the holes.

Specifically, holes may be formed in at least one area of a cushion plate disposed on a rear surface of the display panel, such that various components may be respectively inserted in the holes. Further, holes may be formed in a display panel according to characteristics of the components.

In this way, respectively inserting the various components into the holes formed in the display area rather than the non-display area may allow reduction of the display area to be minimized without increasing the non-display area as much as possible, thus increasing the user's immersion experience.

However, due to the hole formed in the display area, a difference between contrasts in an area where the hole is formed and an area where the hole is not formed may occur due to a difference between transmittances of light in the area where the hole is formed and the area where the hole is not formed.

In particular, when the cushion plate has a black color, a difference between colors in the area where the hole is formed and the area where the hole is not formed becomes more pronounced, and thus a difference between contrasts in the area where the hole is formed and the area where the hole is not formed becomes more pronounced.

Accordingly, when a rolling pattern used to test the display panel is activated under various environmental conditions, element variation in which a color of the screen of the display panel has changed may occur due to the difference between colors in the area where the hole is formed and the area where the hole is not formed.

The element variation in the display panel eventually results in a low gray-level mura around the area where the hole is formed.

Therefore, the present disclosure is directed to a display module which includes a through-hole defined in a display area and reduces the low gray-level mura near the through-hole.

An aspect of the present disclosure is to provide a display module capable of reducing a difference between transmittances in an area in which a hole is formed and an area in which the hole is not formed in a display area.

Another aspect of the present disclosure is to provide a display module capable of realizing reflected light visibility in an area in which a hole is formed and reflected light visibility in an area in which a hole is not formed in the display area close to each other as much as possible.

Another aspect of the present disclosure is to provide a display module that may minimize element variation that may be caused when a rolling pattern for testing a display device is driven under various environmental conditions such as room temperature, high temperature, and high humidity.

Another aspect of the present disclosure is to provide a display module capable of minimizing occurrence of low gray-level mura that may occur due to the element variation.

Additional features and aspects will be set forth in part in the description which follows and in part will become apparent from the description or may be learned by practice of the inventive concepts provided herein. Other features and aspects of the inventive concepts may be realized and attained by the structure particularly pointed out in the written description, or derivable therefrom, and the claims hereof as well as the appended drawings.

A display module according to an embodiment of the present disclosure includes a display panel, a back plate disposed on a rear surface of the display panel, and a cushion plate disposed on a rear surface of the back plate, wherein the cushion plate has at least one through-hole defined therein, and the cushion plate has a transmittance of 20 to 40% at a spectral wavelength of 380 nm to 780 nm.

According to some embodiments of the present disclosure, the transmittance of the cushion plate is measured based on light emitting from the display module in a front direction, and is a transmittance thereof in an area other than an area in which the through-hole is formed.

According to some embodiments of the present disclosure, the cushion plate may include an adhesive layer, a cushion layer, and a heat-dissipation layer, the adhesive layer may have a transmittance of 20 to 40% at a spectral wavelength of 380 nm to 780 nm.

According to some embodiments of the present disclosure, the adhesive layer may have a gray color.

According to some embodiments of the present disclosure, the cushion plate may include an adhesive layer, an adhesive supporting layer, a cushion layer, and a heat-dissipation layer, and at least one of the adhesive layer or the adhesive supporting layer may have a transmittance of 20 to 40% at a spectral wavelength of 380 nm to 780 nm.

According to some embodiments of the present disclosure, at least one of the adhesive layer or the adhesive supporting layer may have a gray color.

According to some embodiments of the present disclosure, the cushion plate has a transmittance of 20 to 40% at a spectral wavelength of 380 nm to 780 nm, such that the difference between transmittances in the area in which the through-hole is formed and the area in which the through-hole is not formed may be reduced as much as possible, and thus the occurrence of the low gray-level mura near the through-hole may be minimized.

The display module according to some embodiments of the present disclosure includes the cushion plate having a transmittance of 20 to 40% at a spectrum wavelength of 380 nm to 780 nm in the area thereof other than the area in which the through-hole is formed, such that the difference between the transmittances in the area in which the through-hole is not formed and the area in which the through-hole is formed may be reduced as much as possible.

Reducing the difference between the transmittances in the area in which the through-hole is not formed and the area in which the through-hole is formed as much as possible may allow reflected-light visibility in the area in which the through-hole is not formed and reflected-light visibility in the area in which the through-hole is formed to be realized in close to each other as much as possible.

Further, according to some embodiments of the present disclosure, the difference between the transmittances in the area in which the through-hole is not formed and the area in which the through-hole is formed may be reduced as much as possible. Thus, element variation that may be caused when the rolling pattern for testing the device is driven under various environmental conditions such as room temperature, high temperature, and high humidity may be minimized.

Further, according to some embodiments of the present disclosure, minimizing the element variation may allow minimizing the occurrence of the low gray-level mura in the vicinity of the area in which the through-hole is formed, which may be otherwise caused by element variation.

It is to be understood that both the foregoing general description and the following detailed description are exemplary and explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principles of the disclosure.

DETAILED DESCRIPTION

Figure 1A:
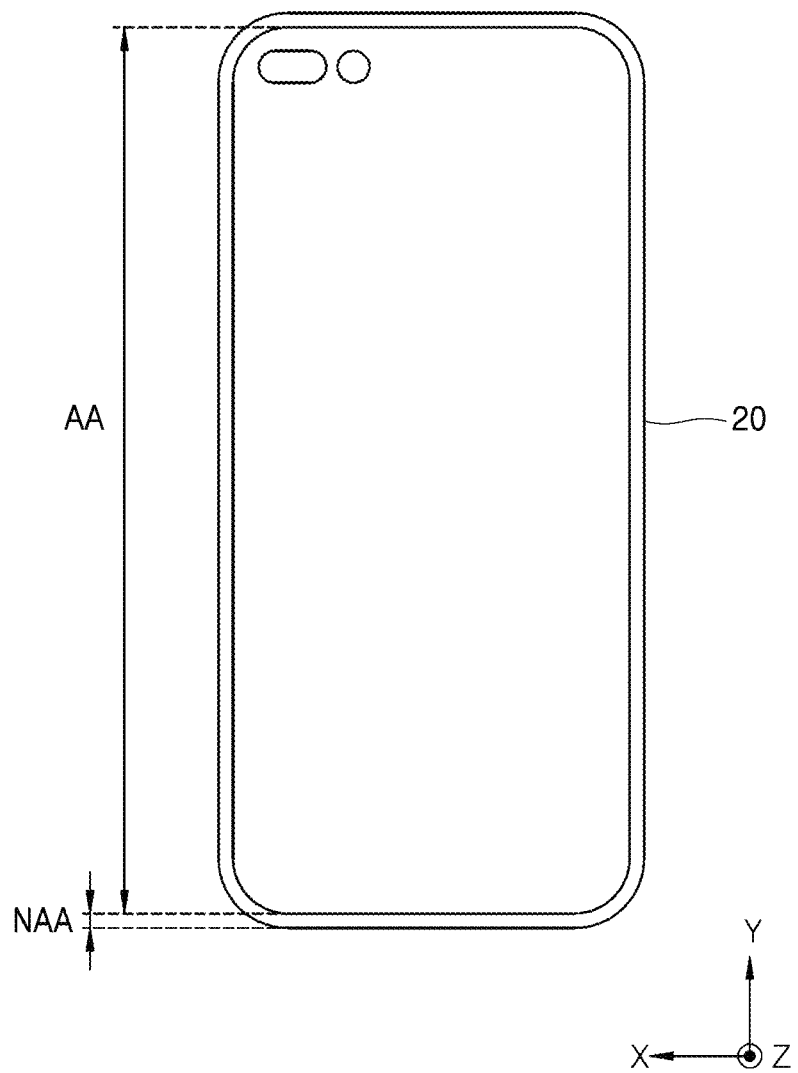
FIGS. 1A and 1B are respectively plan views of a front surface and a rear surface of a display device according to an embodiment of the present disclosure.

Advantages and features of the present disclosure, and a method of achieving the Advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after," "subsequent to," "before," etc., another event may occur therebetween unless "directly after," "directly subsequent" or "directly before" is not indicated.

It will be understood that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Features of the various embodiments of the present disclosure may be partially or overall coupled to or combined with each other, and may be variously inter-operated with each other and driven technically as those skilled in the art can sufficiently understand. Embodiments of the present disclosure may be carried out independently of each other, or may be carried out together in co-dependent relationship.

Hereinafter, various configurations of a display module that may reduce the low gray-level mura near the through-hole will be described in detail.

Figure 1B:
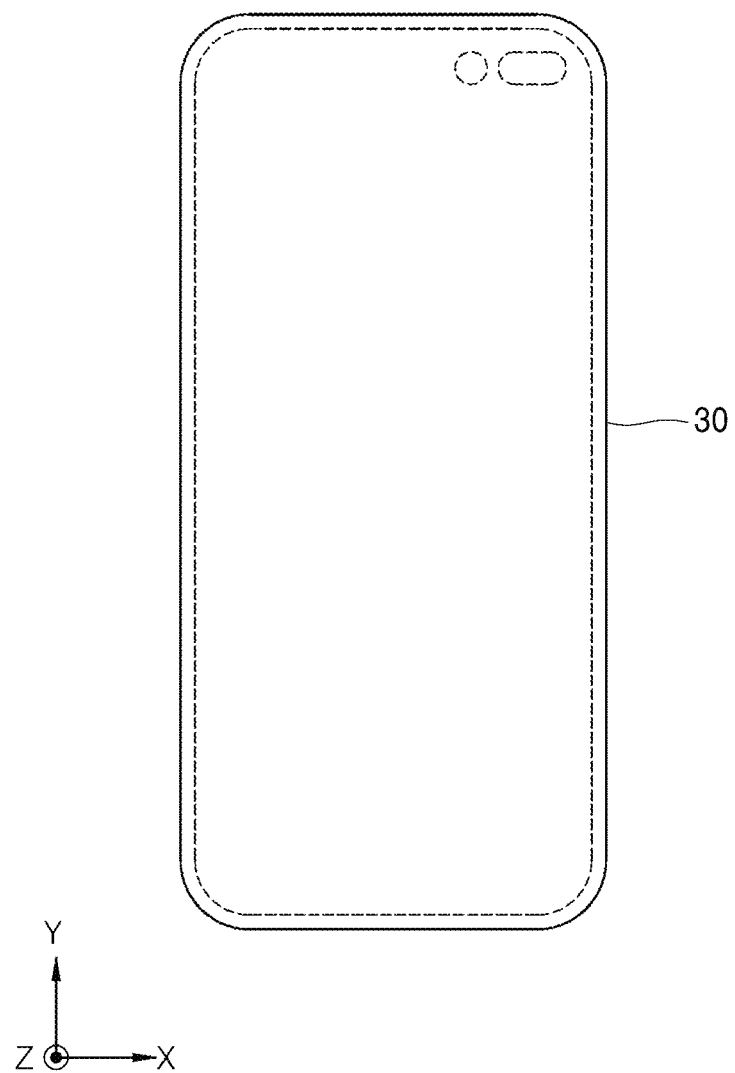

FIG. 1A briefly shows a front surface where a display area AA is located in a display device, and FIG. 1B briefly shows a rear surface of the display device.

Figure 2:
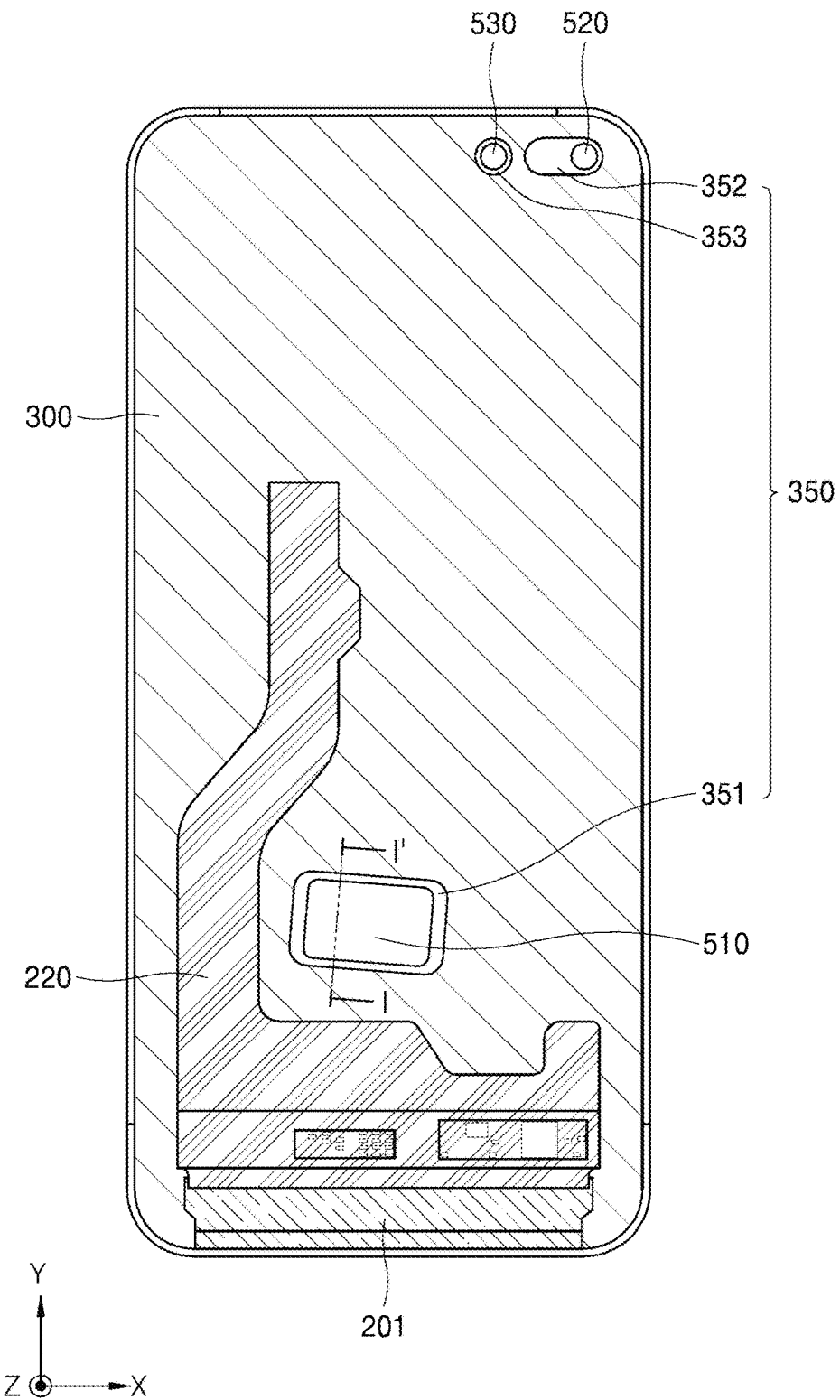
FIG. 2 is a plan view of a rear surface of a display module according to an embodiment of the present disclosure.

Further, FIG. 2 is a plan view of a rear surface of a display module according to an embodiment of the present disclosure.

As used herein, a direction in which the front surface surfaces toward means a direction of a Z-axis, that is, a direction in which a cover member 20 surfaces toward, while a direction toward which the rear surface surfaces means a direction of a −Z-axis, that is, a direction in which a frame 30 surfaces toward. In addition, as used herein, a direction in which a top of the display device 1 or the display module 10 surfaces toward refers to a Y-axis direction, while a direction in which a bottom of the display device 1 or the display module 10 surfaces toward refers to a −Y-axis direction.

The display device 1 includes the display module 10 including the cover member 20 and the frame 30 that is disposed on a rear surface of display module 10 and supports the cover member 20.

The cover member 20 may be disposed to cover the display panel and may protect the display module 10 from external impact.

An edge of the cover member 20 may have a rounding shape formed to be curved in a direction toward a rear surface thereof on which the display panel 200 is disposed.

In this case, the cover member 20 may cover at least a partial area of a side surface of display module 10 disposed on the rear surface thereof, thus protecting not only a front surface of the display module 10, but also the side surface thereof from an external shock.

The cover member 20 includes the display area AA that displays a screen, and thus may be formed of a transparent material such as a cover glass to display the screen. For example, the cover member 20 may be formed of a transparent plastic material, a glass material, or a reinforced glass material.

The frame 30 may be disposed on the rear surface of the display module 10 and therein accommodate the display module 10 and contact the cover member 20 to support the cover member 20.

The frame 30 serves as a housing that defines an outermost rear surface of the display device 1, and may be formed of various materials such as plastic, metal, or glass.

Further, the front surface of the cover member 20 may be divided into the display area AA and the non-display area NAA as an area other than the display area AA. The non-display area NAA may be formed along an edge of the display area AA, and the non-display area NAA may be defined as a bezel area.

FIG. 2 is a plan view of a rear surface of the display module 10 including the cover member 20, and shows a state in which the frame 30 is not combined thereto.

As shown in FIG. 2, in the display module 10, in order to reduce the bezel area, the display panel, specifically, a flexible circuit board 220 coupled to a display substrate 201 may be bent toward a rear surface of the display panel.

The flexible circuit board 220 may be bent at a bottom of the display module 10. Accordingly, the display substrate 201 and the flexible circuit board 220 may overlap each other and constitute a rear surface of the display panel, such that the bezel area may be reduced as much as possible.

The cushion plate 300 may be disposed on the rear surface of the display module 10.

The cushion plate 300 may have at least one through-hole 350 defined therein. For example, the through-hole 350 may include a first through-hole 351, a second through-hole 352, and a third through-hole 353.

In one example, the first through-hole 351 may be disposed near a center of the display area AA where the flexible circuit board 220 is disposed.

A fingerprint sensor module 510 may be inserted from the rear surface of the display module 10 into the first through-hole 351.

In this case, a separate through-hole may not be formed in an area of the display panel 200 corresponding to the first through-hole 351 so that the user in front of the display module 10 does not directly recognize the fingerprint sensor module 510.

The fingerprint sensor module 510 placed on the rear surface of the display panel 200 may be activated upon recognizing that the user touches the front surface of the display module 10.

Therefore, the first through-hole 351 into which the fingerprint sensor module 510 is inserted is disposed at a corresponding position in the display area AA, such that the display area AA may not be reduced.

In one example, the second through-hole 352 and the third through-hole 353 may be disposed in the display area AA near the top of the display module 10.

A camera sensor module 520 may be inserted into the second through-hole 352, and an infrared sensor module 530 may be inserted into the third through-hole 353.

In this case, through-holes may be further defined in positions of the display panel 200 corresponding to the second through-hole 352 and the third through-hole 353, respectively so that the camera sensor module 520 and the infrared sensor module 530 may be recognized by the user in front of the display module 10.

In this way, the camera sensor module 520 and the infrared sensor module 530 are not placed in a separate non-display area NAA, but are respectively inserted into the through-holes defined in the display area AA, thereby minimizing the decrease in the display area AA without increasing the non-display area NAA, thereby increasing the user's immersion.

As described above, the number of through-holes of the cushion plate 300 is not limited to a specific number. An additional through-hole may be formed so that an additional component such as a receiver may be inserted therein.

Hereinafter, a display module including a through-hole according to various embodiments of the present disclosure will be described in detail with reference to FIGS. 3 to 5.

The display module 10 according to an embodiment of the present disclosure includes the display panel 200, a back plate 210 disposed on a rear surface of the display panel 200, and a cushion plate 300 disposed on a rear surface of the back plate 210, wherein the cushion plate has at least one through-hole 350 defined therein.

The display panel 200 may include the display substrate 201 on which a pixel array is disposed.

The display substrate 201 may serve as a base substrate of the display panel 200. The display substrate 201 may be formed of a flexible plastic material and thus may act as a flexible display substrate.

In one example, the display substrate 201 may be formed of polyimide as a plastic material having flexibility, or may be formed of a thin-type glass material having flexibility.

The pixel array may be formed on one surface of the display substrate 201. The pixel array may be formed to correspond to the display area AA that displays an image toward a front surface of the cover member 20.

Therefore, an area of the cover member 20 corresponding to the pixel array may be the display area AA, and an area other than the display area AA may be the bezel area.

The pixel array may be implemented in a form of various elements that display an image. However, the pixel array is not particularly limited.

The pixel array may be disposed in a pixel area defined by signal lines on one surface of the display substrate 201, and may include a plurality of pixels that display an image based on signals supplied to the signal lines. The signal lines may include gate lines, data lines, and pixel driving power lines.

Each of the plurality of pixels may include a switching thin film transistor, an anode electrically connected to the switching thin film transistor, a light-emissive element layer formed on the anode, and a cathode electrically connected to the light-emissive element layer, all of which are disposed in the pixel area.

The anode may be disposed in each pixel area so as to correspond to an opening area defined according to a pattern shape of the pixel, and may be electrically connected to the switching thin film transistor.

In one example, the light-emissive element layer may include an organic light-emissive element formed on the anode. The organic light-emissive element may be implemented to emit light of the same color such as white light in the pixels, or may be implemented to emit different colors such as red, green, and blue light beams in the pixels.

In another example, the light-emissive element layer may include a micro light-emissive diode element electrically connected to each of the anode and the cathode. The micro light-emissive diode element refers to a light-emissive diode implemented in a form of an integrated circuit (IC) or a chip, and may include a first terminal electrically connected to the anode and a second terminal electrically connected to the cathode.

The cathode may be commonly connected to the light-emissive element of the light-emissive element layer disposed in each pixel area.

The back plate 210 is placed on the rear surface of the display panel 200.

The back plate 210 is disposed on the rear surface of the display panel 200 to supplement rigidity of the display panel 200 and keep the display panel 200 flat.

The cushion plate 300 is disposed on the rear surface of the back plate 210.

Figure 3:
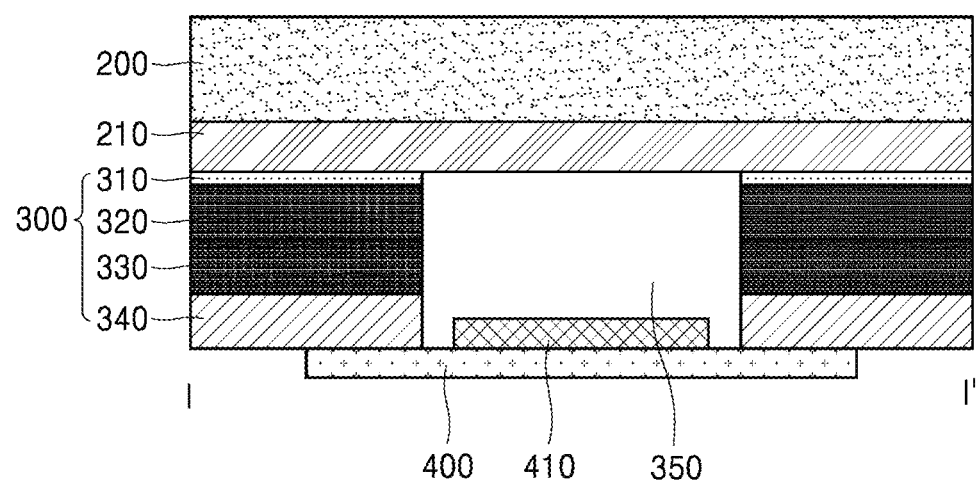
FIG. 3 is a cross-sectional view of a display module including a through-hole according to an embodiment of the present disclosure.

In one embodiment, as shown in FIG. 3, the cushion plate 300 may include an adhesive layer 310, a cushion layer 320, an anti-lift layer 330, and a heat-dissipation layer 340.

Figure 4:
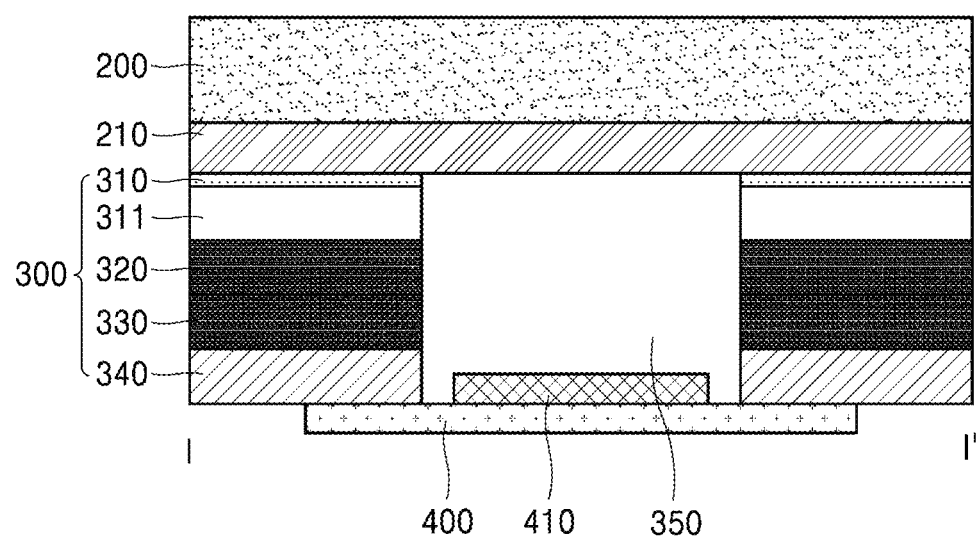
FIG. 4 is a cross-sectional view of a display module including a through-hole according to another embodiment of the present disclosure.
Figure 5:
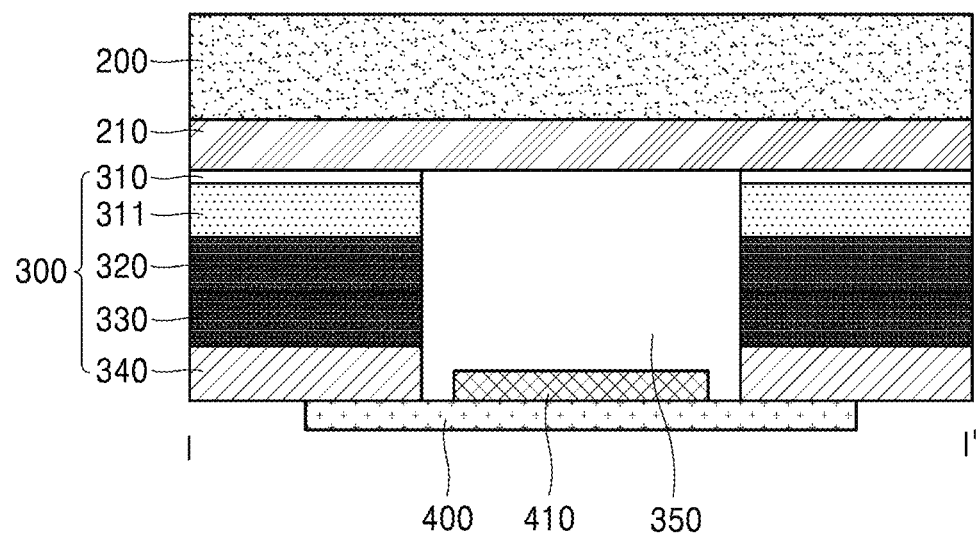
FIG. 5 is a cross-sectional view of a display module including a through-hole according to another embodiment of the present disclosure.

Further, in another embodiment, as shown in FIG. 4 and FIG. 5, the cushion plate 300 may include the adhesive layer 310, an adhesive supporting layer 311, the cushion layer 320, the anti-lift layer 330, and the heat-dissipation layer 340.

The adhesive layer 310, the cushion layer 320, the anti-lift layer 330, and the heat-dissipation layer 340 of the cushion plate 300 may be sequentially stacked in this order toward the rear surface of the display module 10.

Further, the adhesive layer 310, the adhesive supporting layer 311, the cushion layer 320, the anti-lift layer 330 and the heat-dissipation layer 340 of the cushion plate 300 may be sequentially stacked in this order toward the rear surface of the display module 10.

However, an arrangement order of the layers constituting the cushion plate 300 is not limited thereto, and may vary as necessary.

The adhesive layer 310 may be configured to fix the cushion plate 300 to the back plate 210. The adhesive layer 310 may contact the rear surface of the back plate 210 to form an interface with the back plate 210.

In one example, the adhesive layer 310 may be formed of a pressure sensitive adhesive (PSA).

The adhesive supporting layer 311 may support the adhesive layer 310 so that the cushion plate 300 may be firmly fixed to the back plate 210.

Therefore, the adhesive supporting layer 311 may be in contact with the rear surface of the adhesive layer 310 to form an interface with the adhesive layer 310.

The adhesive supporting layer 311 may be embodied as an embossed layer including an uneven structure formed on a surface thereof. The uneven structure of the adhesive supporting layer 311 may prevent bubbles from being generated between the back plate 210 and the cushion plate 300 when the cushion plate 300 is attached to the back plate 210.

The adhesive supporting layer 311 may be formed of a PET material in one example. However, embodiments of the present disclosure are not limited thereto.

The cushion layer 320 may be disposed on a rear surface of the adhesive supporting layer 311.

The cushion layer 320 may include a foam tape or a foam pad, and may have a black color. The cushion layer 320 may function to alleviate impact to be applied to various components that may contact the cushion plate 300. The cushion layer 320 having a shock mitigation function may enhance the rigidity of the cushion plate 300.

The anti-lift layer 330 may be disposed on a rear surface of the cushion layer 320. The anti-lift layer 330 may be formed of a flexible material such as polyimide or PET film.

When the display panel 200 is bent, a curvature occurs. Thus, the cushion plate 300 attached thereto may have a lift defect.

Accordingly, the cushion plate 300 may include the flexible anti-lift layer 330. Thus, although the curvature occurs when the display panel 200 is bent, the lift defect may be minimized.

Further, the anti-lift layer 330 may be embodied as a black layer having a black color. Thus, the anti-lift layer 330 may act as the black layer, thereby improving sensitivity of components in the display device and preventing performance degradation thereof.

The heat-dissipation layer 340 may be disposed on a rear surface of the anti-lift layer 330.

The heat-dissipation layer 340 may be intended for imparting a heat-dissipation effect to a component generating a high temperature, and may include a material having a high thermal conductivity.

For example, the heat-dissipation layer 340 may include a metal layer having high thermal conductivity and, for example, formed of copper, or may include a graphite layer. In addition, since the heat-dissipation layer 340 has electrical conductivity, the heat-dissipation layer 340 may have a heat-dissipation function, a grounding function, and a function to protect the rear surface of the display substrate 201.

The cushion plate 300 includes at least one through-hole 350 extending through the cushion plate 300 and disposed within the display area AA.

In the embodiments according to FIGS. 3 to 5, the first through-hole 351 into which the fingerprint sensor module 510 is inserted is shown as one example of the through-holes 350 of the cushion plate 300.

Since the through-hole 350 is formed to extend through the cushion plate 300, a portion of the cushion plate 300 in an area corresponding to the through-hole 350 is removed away.

Therefore, the area where the through-hole 350 is formed in the cushion plate 300 may have very high transmittance, and may be affected by a transmittance of the back plate 210 placed above the cushion plate 300 and thus may have a transmittance of approximately 85% or greater.

On the contrary, an area of the cushion plate 300 where the through-hole 350 is not formed may include various layers such as the adhesive layer 310, the adhesive supporting layer 311, the cushion layer 320, the anti-lift layer 330 and the heat-dissipation layer 340, and may have a transmittance which may be affected by each of the layers.

For example, at least one of the cushion layer 320 or the anti-lift layer 330 may have a black color. When the adhesive layer 310 and the adhesive supporting layer 311 are transparent, a color of the cushion plate 300 is perceived as black.

However, in the area of the cushion plate 300 in which the through-hole 350 is formed, each of the layers constituting the cushion plate 300 has been removed. Thus, the through-hole area becomes a transparent area that is not recognized as black by the user.

Figure 6A:
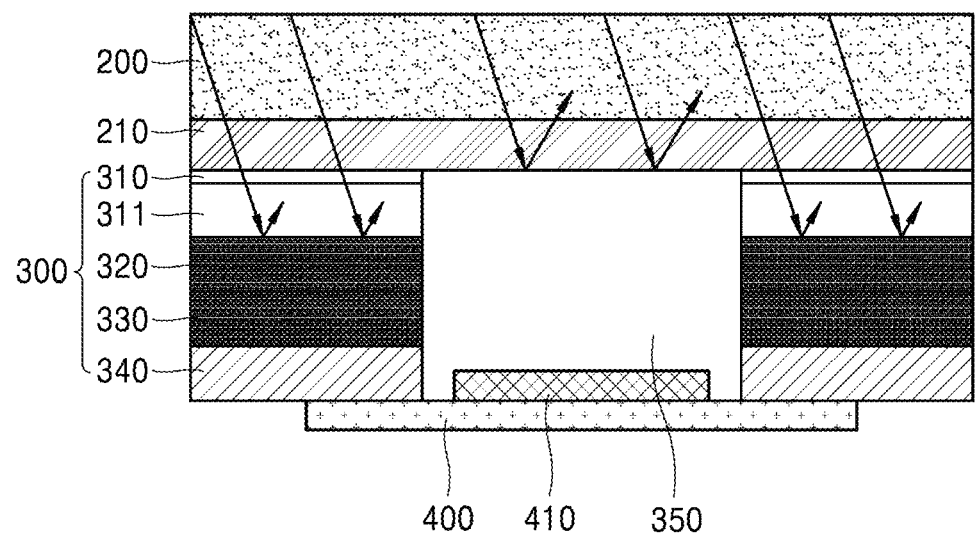
FIG. 6A and FIG. 6B are cross-sectional views showing differences in light reflection due to differences in transmittance according to Comparative Example and an embodiment of the present disclosure, respectively.

FIG. 6A shows that light is reflected in Comparative Example in which each of the cushion layer 320 and the anti-lift layer 330 is black, while each of the adhesive layer 310 and the adhesive supporting layer 311 is transparent.

Light incident through the front surface of the display panel 200 may be reflected from the interface between the layers.

Therefore, light reflection occurs from the interface between the back plate 210 and the cushion plate 300. Most of the light is reflected from the interface between the back plate 210 and an area of the through-hole 350 composed of air.

In one example, in the area where the through-hole 350 is not formed, each of the adhesive layer 310 and the adhesive supporting layer 311 is formed of a transparent layer, while the cushion layer 320 disposed below the adhesive supporting layer 311 is black, such that the cushion plate 300 is generally recognized as black.

Therefore, most of the light incident through the front surface of the display panel 200 passes through the adhesive layer 310 and the adhesive supporting layer 311 and is not reflected from the interface of the cushion layer 320, but is absorbed into the cushion layer 320 having a black color.

In other words, in the display module 10 of the same structure as in Comparative Example, large differences between transmittances and between reflectances in the area where the through-hole 350 is formed and the area where the through-hole 350 is not formed occur due to the large difference between colors in the area where the through-hole 350 is formed and the area in which the through-hole 350 is not formed.

As a result, a large difference between contrasts in the area in which the through-hole 350 is formed and the area where the through-hole 350 is not formed. Such a large difference in the contrast may cause the element variation.

Specifically, the element may include the pixel array having the light-emissive element layer. The area where the through-hole 350 is formed dose not include the cushion plate 300, the contrast or contrast ratio may be lowered by the reflected light, and display characteristics may be deteriorated. In order to cover the deteriorated display characteristics, current is continuously applied to the area where the through-hole 350 is formed, and thus the light emissive element layer may become white, that is, the element variation may occur.

In other words, when an image is displayed on the display panel 200, current applied to the area where the through-hole 350 is formed and current applied to the area in which the through-hole 350 is not formed may be different from each other. Due to an error in the perception, current is continuously applied to the area where the through-hole 350 is formed, such that the element may become white, that is, the element variation may occur.

The element variation in the display panel eventually causes a problem that the low gray-level mura may occur around the area where the through-hole 350 is formed.

In order to solve this problem, the cushion plate 300 according to an embodiment of the present disclosure is formed to have a transmittance of 20 to 40% at a spectral wavelength of 380 nanometers ("nm") to 780 nm.

In this case, the transmittance of the cushion plate 300 means a transmittance as measured based on light emitting from the display module 10 in a front direction.

Specifically, the transmittance of the cushion plate 300 refers to the transmittance of the cushion plate 300 in the area other than the area in which the through-hole is formed 350.

Specifically, in an example as shown in FIG. 3, the adhesive layer 310 may have a transmittance of 20 to 40% at a spectral wavelength of 380 nm to 780 nm.

In addition, in an example as shown in FIGS. 4 and 5, at least one of the adhesive layer 310 or the adhesive supporting layer 311 may have a transmittance of 20 to 40% at a spectral wavelength of 380 nm to 780 nm.

Thus, when at least one of the adhesive layer 310 or the adhesive supporting layer 311 has a transmittance of 20 to 40% at a spectral wavelength of 380 nm to 780 nm, the transmittance of the cushion plate 300 measured based on light emitting from the display panel 200 in a front direction has of 20 to 40% at a spectral wavelength of 380 nm to 780 nm.

According to an embodiment of the present disclosure, in order for the cushion plate 300 to have the transmittance of 20 to 40% at a spectral wavelength of 380 nm to 780 nm, at least one of the adhesive layer 310 or the adhesive supporting layer 311 may be gray.

When, as described above, at least one of the adhesive layer 310 or the adhesive supporting layer 311 is gray, the cushion plate 300 may have a transmittance of 20 to 40% at a spectral wavelength of 380 nm to 780 nm.

The gray color may be expressed by reading data values of L*, A*, and B* using a colorimeter and reading ΔE*ab (color difference) between the data values and those of a standard sample.

For example, a standard sample may be selected, and a corresponding color of the selected standard sample may be used as a reference, such that a color difference is adjusted to ±3, thereby adjusting a color in a range from light gray to dark gray depending on a magnitude of the color difference.

When, as described above, the cushion plate 300 has the gray color, and even when the cushion layer 320 is black, the cushion plate 300 is not recognized as black, but is generally perceived as gray.

Therefore, when compared with the cushion plate 300 perceived as black as in Comparative Example, the cushion plate 300 perceived as gray as in the example of the present disclosure has decrease in color difference from the color of the through-hole area, such that the contrast difference thereof from that of the through-hole area may be reduced.

Figure 6B:
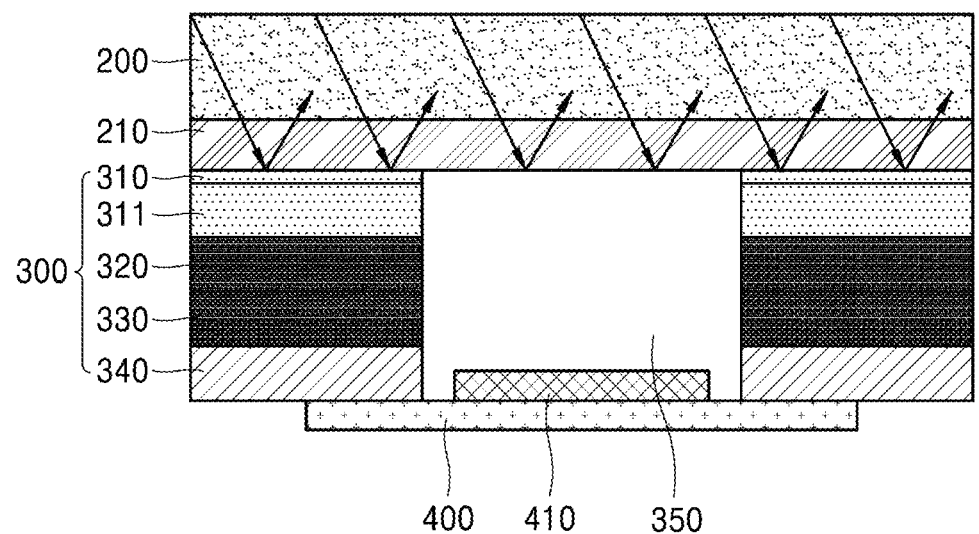

FIG. 6B shows that light is reflected in an embodiment of the present disclosure in which each of the cushion layer 320 and the anti-lift layer 330 is black, while each of the adhesive layer 310 and the adhesive supporting layer 311 is gray and thus has a transmittance of 20 to 40% at a spectral wavelength of 380 nm to 780 nm.

As described above, light incident through the front surface of the display panel 200 may be reflected from the interface between the layers.

Therefore, light reflection occurs from the interface between the back plate 210 and the cushion plate 300. Most of the light is reflected from the interface between the back plate 210 and the area of the through-hole 350 composed of air.

In one example, in the area where through-hole 350 is not formed, each of the adhesive layer 310 and the adhesive supporting layer 311 is gray. Thus, even when the cushion layer 320 disposed below the adhesive supporting layer 311 is black, the cushion plate 300 is generally perceived as gray.

Therefore, most of the light incident through the front surface of the display panel 200 is reflected from the interface between the back plate 210 and the adhesive layer 310.

That is, in the display module according to the embodiment of the present disclosure, the cushion plate has a transmittance of 20 to 40% at a spectral wavelength of 380 nm to 780 nm in an area other than the area in which the through-hole is formed. Thus, the difference between the transmittances in the area in which the through-hole is not formed and the area in which the through-hole is formed may be reduced as much as possible.

Further, reducing the difference between the transmittances in the area in which the through-hole is formed and the area in which the through-hole is not formed as much as possible may allow the reflected light visibility in the area in which the through-hole is not formed and the reflected light visibility in the area in which the through-hole is formed to be realized close to each other as much as possible.

Further, in the display module according to the embodiment of the present disclosure, the difference between the transmittances in the area in which the through-hole is not formed and the area in which the through-hole is formed may be reduced as much as possible. Thus, the element variation that may be caused when the rolling pattern for testing the device is driven under various environmental conditions such as room temperature, high temperature, and high humidity may be minimized.

In this way, minimizing the element variation may allow minimizing the occurrence of the low gray-level mura in the vicinity of the area in which the through-hole is formed, which may occur due to the element variation.

Figure 7A:
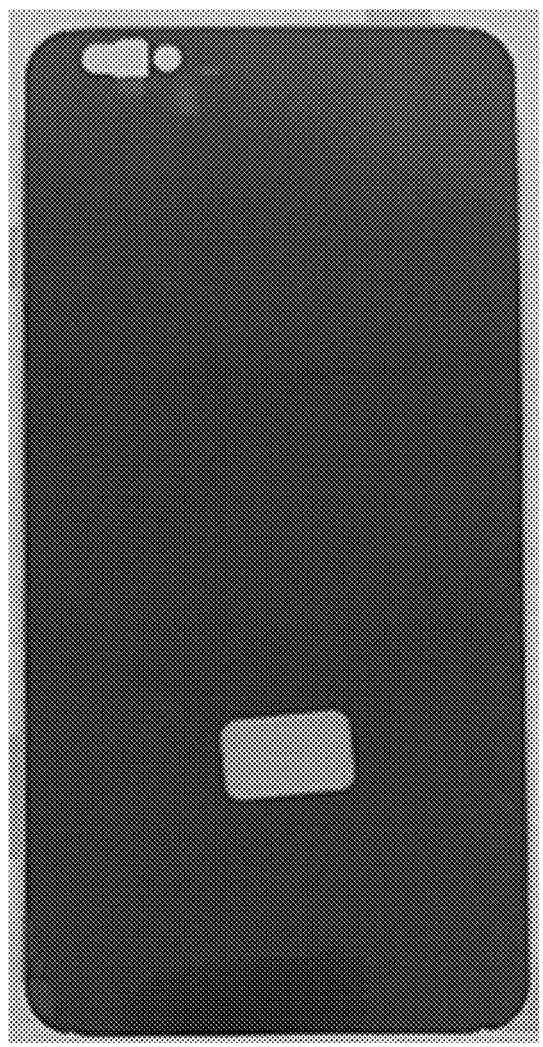
FIG. 7A and FIG. 7B are actual photographs of cushion plates according to Comparative Example and an embodiment of the present disclosure, respectively.
Figure 7B:
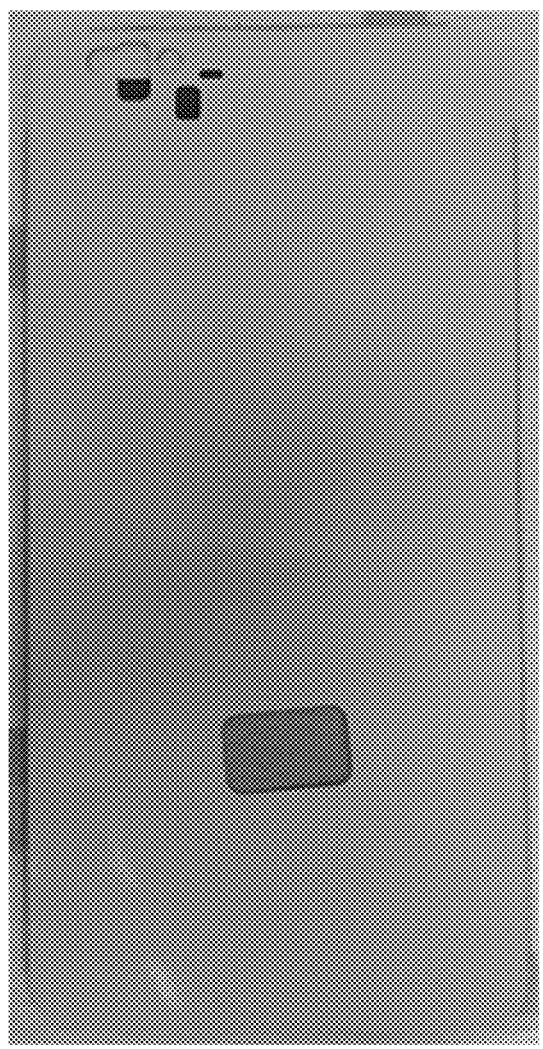

FIG. 7A and FIG. 7B are actual photographs of cushion plates according to Comparative Example and an embodiment of the present disclosure, respectively.

Specifically, in Comparative Example according to FIG. 7A, the cushion plate is recognized as black, while in the embodiment according to FIG. 7B, the cushion plate is recognized as gray.

As may be seen in FIG. 7A, when the cushion plate is recognized as black according to the Comparative Example, it may be seen that a very large difference between contrasts in the area where the through-hole is formed and the area where the through-hole is not formed may occur.

To the contrary, as may be seen in FIG. 7B, when the cushion plate that is perceived as gray according to the embodiment of the present disclosure, the difference between contrasts in the area where the through-hole is formed and the area where the through-hole is not formed may be significantly reduced compared to the Comparative Example.

Figure 8A:
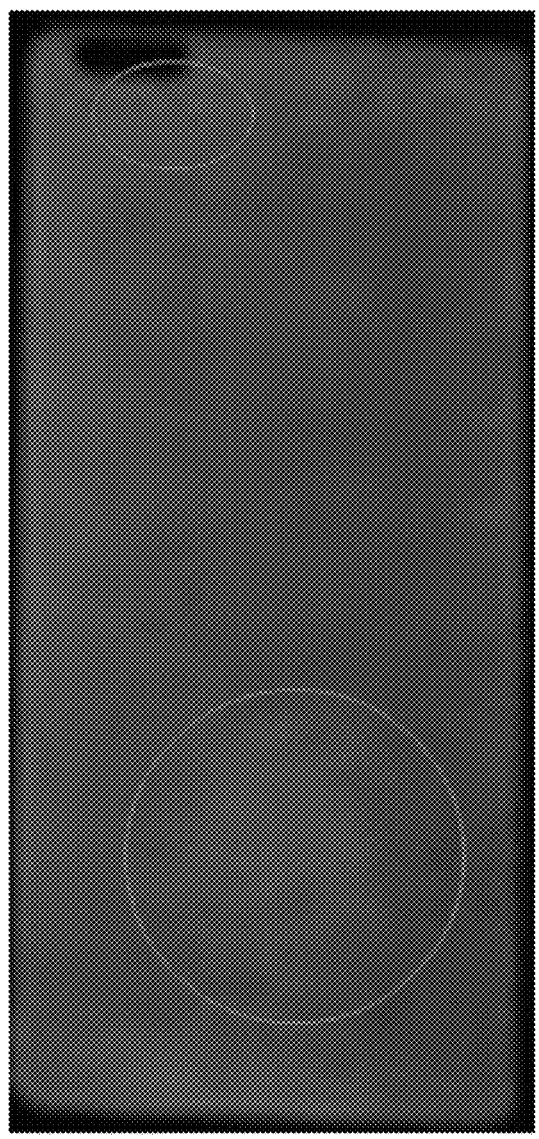
FIG. 8A and FIG. 8B are actual photographs of front portions of display modules including cushion plates according to Comparative Example and an embodiment of the present disclosure, respectively.
Figure 8B:
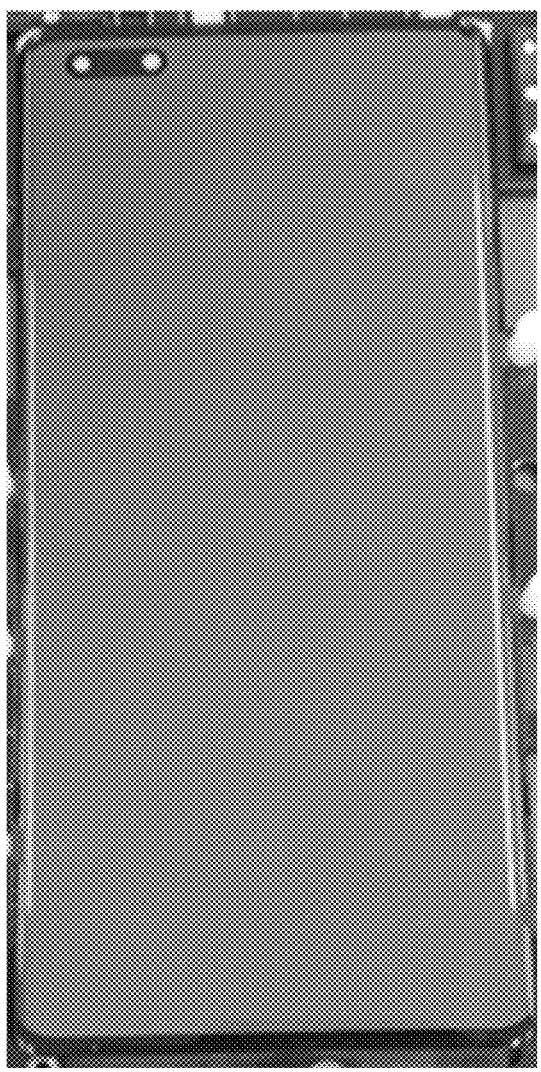

FIG. 8A and FIG. 8B are actual photos of front portions of display modules including cushion plates according to Comparative Example and an embodiment of the present disclosure, respectively.

As may be seen in FIG. 8A, in the front portion of the display module including the cushion plate as perceived as black according to Comparative Example, the mura may occur near the area corresponding to the through-hole.

To the contrary, as may be seen in FIG. 8B, in the front portion of the display module including the cushion plate perceived as gray according to an embodiment of the present disclosure, the mura may not occur near the area corresponding to the through-hole. Thus, it may be clearly identified that the mura is suppressed according to an embodiment of the present disclosure, compared to Comparative Example.

In one example, it is general that in providing the display module 10 to a consumer for manufacturing the display device 1, the display module 10 is shipped in a state in which the frame 30 is not coupled to the rear surface of the display module 10 and the rear surface of display module 10 is exposed.

Therefore, when the display module 10 is moved or stored for shipment to the consumer while the frame 30 is not attached to the display module 10, a rear surface protective film (or a protective film) 400 may be attached to protect the rear surface of the display module 10.

In particular, the rear surface protective film 400 covering the through-hole 350 may be attached to the display module 10 including the through-hole 350 to prevent contamination due to invasion or permeate of foreign substances through the through-hole 350 into the module.

Accordingly, the rear surface protective film 400 covering the through-hole 350 of the display module 10 may be attached to the rear surface of the display module 10.

In one example, the rear surface protective film 400 may be combined with the rear surface of the display panel 200 while being attached to the cushion plate 300. The rear surface protective film 400 may be attached onto the rear surface of the cushion plate 300 to cover the through-hole 350.

However, embodiments of the present disclosure are not limited thereto. The rear surface protective film 400 may be provided separately from the cushion plate 300. In this case, the cushion plate 300 may be first attached to the rear surface of the display module 10, and then, the rear surface protective film 400 may be additionally attached to the rear surface of the display module 10.

As the rear surface protective film 400 covers the through-hole 350, the invasion of foreign substances into the through-hole 350 or damage of the module due to external impact may be minimized.

Since the rear surface protective film 400 contacts the rear surface of the cushion plate 300, the film 400 not only protects the surface of the cushion plate 300 itself, but also protects the through-hole 350 passing through the cushion plate 300.

In one example, the rear surface protective film 400 according to an embodiment according to the present disclosure may further include an anti-transfer layer 410 which may be attached to a front surface of the rear surface protective film 400, and be located in the through-hole 350.

A rear surface protective film adhesive layer may be additionally disposed between the rear surface protective film 400 and the anti-transfer layer 410.

When the anti-transfer layer 410 is placed on the front surface of the rear surface protective film 400, invasion of an adhesive material of the rear surface protective film 400 into the cover member 20 or the display panel 200 may be minimized.

The front surface of the rear surface protective film 400 means a surface of the rear surface protective film 400 facing toward the cover member 20.

Since the rear surface protective film 400 must be attached to the cushion plate 300, the rear surface protective film adhesive layer is formed on one surface of the rear surface protective film 400 to which the cushion plate 300 is attached.

The rear surface protective film 400 is attached to the cushion plate 300 to cover the through-hole 350. Thus, after the rear surface protective film 400 is attached to the cushion plate 300, the rear surface protective film adhesive layer is exposed toward the through-hole 350 in the display area AA of the display panel 200.

In this case, depending on a position of the through-hole 350, the through-hole 350 may be formed up to in an area corresponding to the display panel 200 and the back plate 210, so that the cover member 20 as a top portion of the display module 10 may be exposed through the through-hole 350.

Therefore, when pressure or impact is applied to the rear surface protective film 400 in a handling process during a manufacturing process of the display module 10 the adhesive materials in the rear surface protective film adhesive layer may be transferred to an inner surface of the cover member 20, thereby contaminating the cover member 20 and thus causing stains.

When the inner surface of cover member 20 is contaminated with the adhesive material, performance of the camera module that is fastened to the through-hole 350 is degraded.

However, as in one embodiment according to the present disclosure, the anti-transfer layer 410 is additionally disposed on the rear surface protective film adhesive layer on the front surface of the rear surface protective film 400 facing toward the cover member 20. Thus, even when the rear surface protective film 400 comes into contact with the cover member 20 during the handling process, the adhesive material may be prevented from being transferred to the cover member 20.

The anti-transfer layer 410 may be formed of a transparent material.

Since the anti-transfer layer 410 is disposed in a corresponding manner to the through-hole 350, and is formed of a transparent material, even when the rear surface protective film 400 and the anti-transfer layer 410 are not removed away, presence or absence of foreign substances inside the through-hole 350 may be easily identified.

The anti-transfer layer 410 may be formed of a PET material. However, embodiments of the present disclosure are not limited thereto.

A display module according to an embodiment of the present disclosure will be described below.

A display module according to an embodiment of the present disclosure comprises a display panel, a back plate disposed on a rear surface of the display panel, and a cushion plate disposed on a rear surface of the back plate, wherein the cushion plate has at least one through-hole defined therein.

According to some embodiments of the present disclosure, the cushion plate may have a transmittance in a range of 20% to 40% to light at a spectral wavelength of 380 nm to 780 nm.

According to some embodiments of the present disclosure, the transmittance of the cushion plate is measured based on light emitted from the display panel in a front direction, and the transmittance of the cushion plate in a first area of the cushion plate different from a second area of the cushion plate including the at least one through-hole.

According to some embodiments of the present disclosure, the cushion plate may include an adhesive layer, a cushion layer, and a heat-dissipation layer, and the adhesive layer may have a transmittance in a range of 20% to 40% to light at a spectral wavelength of 380 nm to 780 nm.

According to some embodiments of the present disclosure, the adhesive layer may have a gray color.

According to some embodiments of the present disclosure, the adhesive layer, the cushion layer, and the heat-dissipation layer may be sequentially stacked on the rear surface of the display panel.

According to some embodiments of the present disclosure, the cushion plate may include an adhesive layer, an adhesive supporting layer, a cushion layer, and a heat-dissipation layer, and at least one of the adhesive layer and the adhesive supporting layer may have a transmittance in the range of 20% to 40% to light at a spectral wavelength of 380 nm to 780 nm.

According to some embodiments of the present disclosure, the adhesive layer, the adhesive supporting layer, the cushion layer, and the heat-dissipation layer may be sequentially stacked on the rear surface of the display panel.

According to some embodiments of the present disclosure, at least one of the adhesive layer and the adhesive supporting layer may have a gray color.

According to some embodiments of the present disclosure, the adhesive layer may be in contact with the back plate.

According to some embodiments of the present disclosure, the adhesive supporting layer may be in contact with the adhesive layer, and the adhesive layer may be in contact with the back plate.

According to some embodiments of the present disclosure, the cushion plate may further include an anti-lift layer between the heat-dissipation layer and the cushion layer, and the anti-lift layer may be black color.

According to some embodiments of the present disclosure, a portion of the cushion plate corresponding to the at least one through-hole may be removed.

According to some embodiments of the present disclosure, the display module may further include a protective film attached to the rear surface of the cushion plate to cover the at least one through-hole.

According to some embodiments of the present disclosure, the display module may further include an anti-transfer layer attached to a front surface of the protective film and disposed in the at least one through-hole.

According to some embodiments of the present disclosure, the display module may further include a fingerprint sensor module or a camera module accommodated into the at least one through-hole.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

The invention claimed is:

1. A display module, comprising:
a display panel;
a back plate disposed on a rear surface of the display panel; and
a cushion plate disposed on a rear surface of the back plate, the cushion plate being a multi-layer stack and including at least one through-hole through an entirety of the multi-layer stack,
wherein an upper layer of the multi-layer stack of the cushion plate, facing the rear surface of the display panel, has a reflectance in a range of 20% to 40% to light at a spectral wavelength of 380 nm to 780 nm,
wherein the light incident through the front surface of the display panel that is reflected back, is mostly reflected from the interface between the back plate and the upper layer of the multi-layer stack of the cushion plate, and from the interface between the back plate and the at least one through-hole,
wherein the reflectance of the upper layer is similar to a reflectance of the at least one through-hole to reduce a difference in transmittance of light between an area of the cushion plate proximate the at least one through-hole, and the at least one through-hole, and
wherein the reflectance of the upper layer and the reflectance of the at least one through-hole are measured based on light emitted from the display panel in a front direction opposite to the rear surface of the display panel.

2. The display module of claim 1, wherein the multi-layer stack of the cushion plate includes an adhesive layer, a cushion layer, and a heat-dissipation layer, and wherein the adhesive layer is the upper layer having the reflectance in a range of 20% to 40% to light at a spectral wavelength of 380 nm to 780 nm.

3. The display module of claim 2, wherein the adhesive layer has a gray color.

4. The display module of claim 2, wherein the adhesive layer, the cushion layer, and the heat-dissipation layer are sequentially stacked on the rear surface of the display panel to overlap in the up-down direction.

5. The display module of claim 1, wherein the cushion plate includes an adhesive layer, an adhesive supporting layer, a cushion layer, and a heat-dissipation layer, and
wherein the adhesive layer or the adhesive supporting layer, or a combination thereof, is the upper layer having the reflectance in the range of 20% to 40% to light at a spectral wavelength of 380 nm to 780 nm.

6. The display module of claim 5, wherein the adhesive layer, the adhesive supporting layer, the cushion layer, and the heat-dissipation layer are sequentially stacked on the rear surface of the display panel to overlap in the up-down direction.

7. The display module of claim 5, wherein at least one of the adhesive layer and the adhesive supporting layer has a gray color.

8. The display module of claim 2, wherein the adhesive layer is in contact with the back plate.

9. The display module of claim 5, wherein the adhesive supporting layer is in contact with the adhesive layer, and wherein the adhesive layer is in contact with the back plate.

10. The display module of claim 2, wherein the cushion plate further includes a flexible film between the heat-dissipation layer and the cushion layer, and wherein the flexible film has a black color.

11. The display module of claim 5, wherein the cushion plate further includes a flexible film between the heat-dissipation layer and the cushion layer, and wherein the flexible film has a black color.

12. The display module of claim 1, wherein a portion of the cushion plate corresponding to the at least one through-hole is removed.

13. The display module of claim 1, further comprising:
a protective film attached to a rear surface of the cushion plate and disposed to cover the at least one through-hole.

14. The display module of claim 13, further comprising:
a transparent film attached to a front surface of the protective film and disposed in the at least one through-hole.

15. The display module of claim 1, further comprising:
a fingerprint sensor module or a camera module accommodated into the at least one through-hole.

16. A display module, comprising:
a display panel;
a back plate disposed on a rear surface of the display panel; and
a cushion plate disposed on a rear surface of the back plate, the cushion plate being a multi-layer stack and including at least one through-hole through an entirety of the multi-layer stack,
wherein an upper layer of the multi-layer stack of the cushion plate, facing the rear surface of the display panel, has a gray color, and a reflectance that is similar to a reflectance of the at least one through-hole to reduce a difference in transmittance of light between an area of the cushion plate proximate the at least one through-hole, and the at least one through-hole, wherein the front portion of the display module including the cushion plate is perceived as having a gray color even when a layer below the upper layer of the multi-layer stack of the cushion plate has a black color, wherein the light incident through the front surface of the display panel that is reflected back, is mostly reflected from the interface between the back plate and the upper layer of the multi-layer stack of the cushion plate, and from the interface between the back plate and the at least one through-hole, and wherein the reflectance of the upper layer and the reflectance of the at least one through-hole are measured based on light emitted from the display panel in a front direction opposite to the rear surface of the display panel.

17. The display module of claim 16, wherein the reflectance of the upper layer is in a range of 20% to 40% to light at a spectral wavelength of 380 nm to 780 nm.

18. The display module of claim 16, wherein the multi-layer stack of the cushion plate includes an adhesive layer, a cushion layer, and a heat-dissipation layer stacked in sequential order, and wherein the adhesive layer is the upper layer of the multi-layer stack.

19. The display module of claim 16, wherein the multi-layer stack of the cushion plate includes an adhesive layer, an adhesive supporting layer, a cushion layer, and a heat-dissipation layer stacked in sequential order, and wherein the adhesive layer or the adhesive layer is the upper layer of the multi-layer stack.

* * * * *